M. ICHTERTZ.
LEVEL.
APPLICATION FILED JAN. 27, 1909.
941,368.
Patented Nov. 30, 1909.
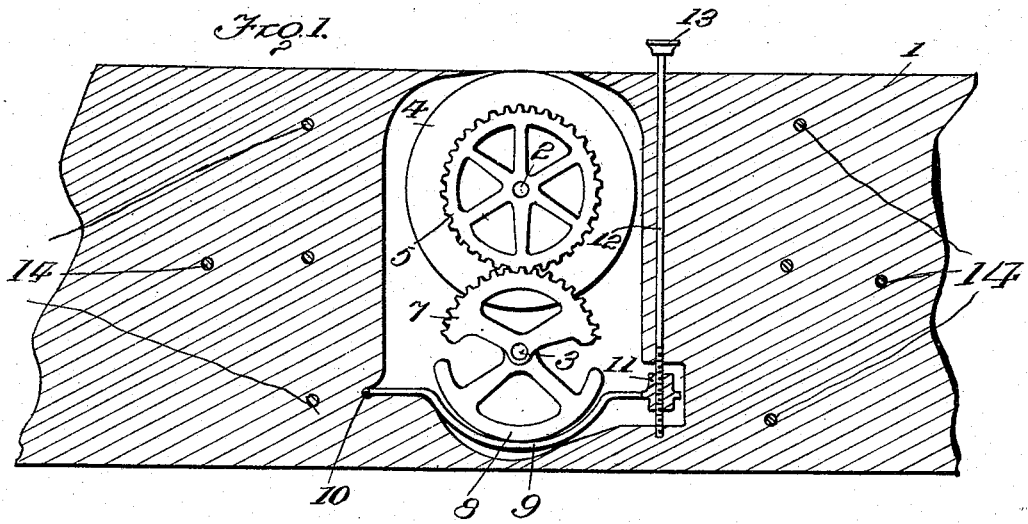
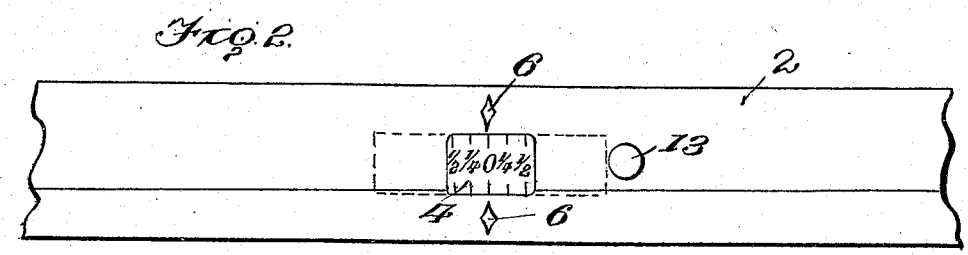
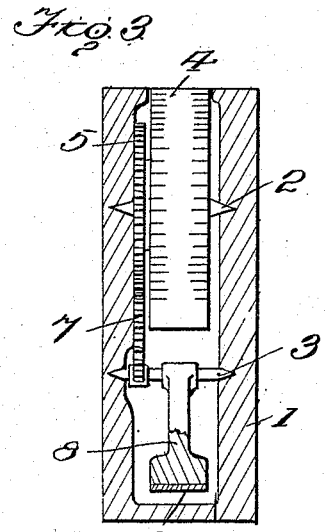
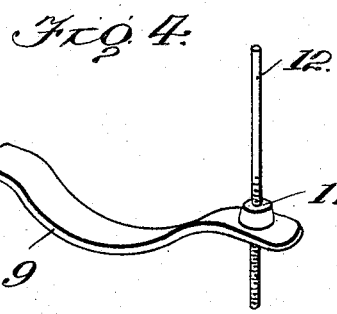
Witnesses
Inventor
Michael Ichtertz.
By
Attorneys

UNITED STATES PATENT OFFICE.

MICHAEL ICHTERTZ, OF PESCADERO, CALIFORNIA.

LEVEL.

941,368.   Specification of Letters Patent.   Patented Nov. 30, 1909.

Application filed January 27, 1909. Serial No. 474,500.

*To all whom it may concern:*

Be it known that I, MICHAEL ICHTERTZ, a citizen of the United States, residing at Pescadero, in the county of San Mateo and State of California, have invented certain new and useful Improvements in Levels, of which the following is a specification.

This invention appertains to instruments for determining the horizontal, the vertical and any required angle between these points, said instrument being generally designated as a level. The invention provides a novel mechanism adapted to be actuated in its working parts by means of gravitative action, thereby overcoming the objectionable features of the ordinary spirit level, while at the same time insuring accuracy in determining the position of lines and surfaces with reference to the horizontal and vertical.

In carrying out the invention the mechanism illustrated in the accompanying drawings and described hereinafter has been devised, the same comprising a dial, a pivoted weight, operating gearing between the dial and weight, and means for holding the parts stationary when the instrument is not in use, so as to prevent disarrangement of the mechanism or possible injury thereto from jar or other cause tending to disable geared parts delicately mounted.

For a full understanding of the invention and the merits thereof and also to acquire a knowledge of the details of construction and the means for effecting the result reference is to be had to the following description and accompanying drawings, in which:

Figure 1 is a vertical longitudinal section of a portion of a level embodying the invention, showing the operating parts in elevation; Fig. 2 is a top view of the instrument; Fig. 3 is a transverse section through the instrument, a portion of the weight being broken away and the brake coöperating therewith being in section; and, Fig. 4 is a detail perspective view of the brake and a portion of the operating rod therefor.

Corresponding and like parts are referred to in the following description and indicated in all the views of the drawings by the same reference characters.

The level comprises a stock or body 1 which may be of any size or material, the same having a recess to receive the working parts. Two shafts or arbors 2 and 3 are provided and arranged in parallel relation and mounted within the recess of the body in transverse position. A dial 4 and gear wheel 5 are mounted upon the shaft 2, so as to turn therewith. The dial 4 is of circular cylindrical form and is graduated to indicate any degree. The upper portion of the dial is readable through an opening formed in the upper edge or side of the body and the latter is supplied with indicating marks 6 to coöperate with the graduations of the dial to indicate any required angular position of a surface or line upon which the instrument may be placed.

A toothed segment 7 is fast to the shaft 3 and is in mesh with the gear wheel 5. A weight 8 is attached to the shaft 3 and normally hangs pendent therefrom. The weight 8 is formed on the arc of a circle and is adapted to hang in a vertical position under all conditions, being acted upon by gravitational force. It will be understood that the body or stock 1 may assume different angular positions, but in every adjustment the weight 8 will hang in a vertical position and through the gearing 5 and 7 will hold the dial in a relatively fixed position, the graduations indicating the changed position of the body or stock and the inclination of the surface or line to be determined.

This operation is well understood in instruments of this type. To prevent play or movement of the parts when the instrument is not in active operation, a brake is provided, the same consisting of a strip 9 having its middle portion curved to conform to the curvature of the weight 8, so as to engage therewith. The brake 9 is pivoted at one end is shown at 10 and its opposite end is formed with a boss 11 having an internally threaded opening to receive the threaded portion of a rod 12 which is mounted in the body or stock 1, the upper end of said rod extending beyond the body and formed with a button 13. By turning the rod 12 the brake may be moved so as to either clear the weight 8 or to engage therewith and hold the parts against movement, as may be required.

For the purpose of introducing the mechanism employed in the formation of this level the stock 1 is composed of two portions which are of elongated formation, one of which is hollowed to form the slot for the reception of the mechanism, the sections being secured together in any suitable manner as by the employment of screws 14 or the like which are transversely disposed through the stock 1. This permits ready access to the mechanism which can be gained by the removal of the screws 14 and the separating of the sections.

Having thus described the invention what is claimed as new is:

1. A level comprising a stock having a chamber formed centrally thereof and an opening in the upper edge of the same communicating with the chamber, a shaft transversely disposed in the upper end of the chamber of said stock, a cylindrical dial mounted on said shaft, a gear-wheel disposed at one end of the shaft, an arbor transversely positioned in the lower end of the chamber and said stock in vertical alinement with said shaft, a segment disposed on said arbor and meshed with said gear-wheel, and a pendent weight carried by said arbor adapted to normally hang in a vertical position irrespective of the angle of said stock to indicate upon said dial the angle of said stock.

2. A level comprising a chambered stock, a shaft transversely disposed in the upper end of the chamber, a dial carried by said shaft, a gear-wheel disposed on said shaft for rotating said dial, an arbor disposed in the lower end of the chamber in vertical alinement with said shaft, a segment carried by said arbor and meshed with said gear-wheel, an arcuate weight depending from said arbor to actuate said dial, a strip pivotally carried by said stock at the lower end of said chamber and having an arcuate portion to conform to the curvature of said weight, a boss disposed upon the free extremity of said strip having internal threads and a rod upwardly extended through said stock, said rod being disposed in threaded engagement with said boss for forcing said strip against said weight.

In testimony whereof I affix my signature in presence of two witnesses.

MICHAEL ICHTERTZ. [L. S.]

Witnesses:
C. J. COBURN,
M. J. PERRY.